C. H. Bacon,
Governor,
No. 77,948. Patented May 19, 1868.
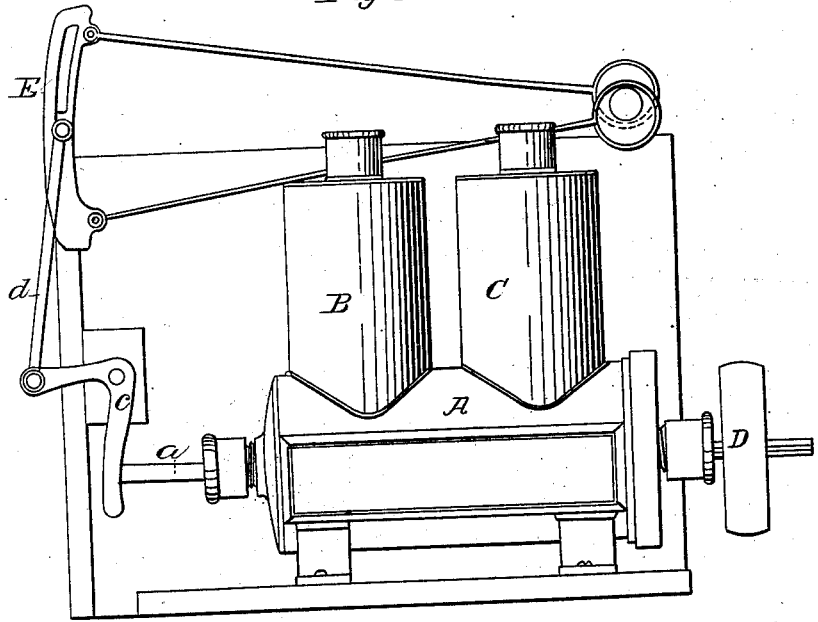
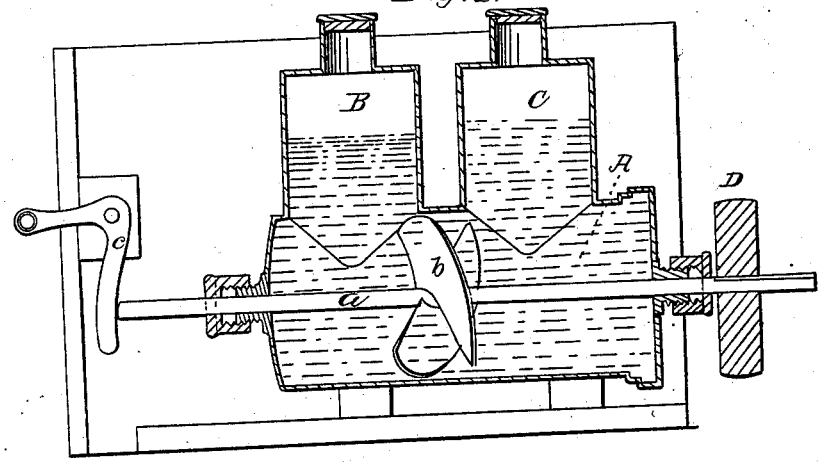

United States Patent Office.

CHARLES H. BACON, OF BOSTON, MASSACHUSETTS, ASSIGNOR TO HIMSELF AND WILLIAM READ, JR, OF SAME PLACE.

*Letters Patent No. 77,948, dated May 19, 1868.*

GOVERNOR FOR STEAM-ENGINES.

*The Schedule referred to in these Letters Patent and making part of the same.*

Be it known that I, CHARLES H. BACON, of Boston, in the county of Suffolk, and State of Massachusetts, have invented a new and useful Improvement in the Mode of Regulating the Speed of Steam-Engines, of which the following is a full, clear, and exact description, reference being had to the accompanying drawings, making a part of this specification, in which—

Figure 1 represents an elevation of an apparatus and its connections embodying my invention, and Figure 2 is a vertical longitudinal section of the same.

The object of my invention is to provide a simple and efficient means of regulating the speed of steam or other engines; and the invention consists in operating the link which controls the valve by means of a shaft passing through a vessel containing water or other fluid, on which shaft is arranged a propeller, and the shaft being allowed a horizontal motion, forward and back, through the ends of the water-vessel.

The shaft, with the propeller, is operated or rotated by gearing, or a pulley and belt, from the main shaft, so that, by the increased or decreased velocity of the propeller, the shaft will move forward or backward, being influenced by the resistance of the fluid, and operate a lever which is connected with the link that controls the valve.

Referring to the drawings, A represents a cylindrical vessel or reservoir, for containing water or other fluid. On the top of the cylinder A are two chambers, B C, opening into the vessel A, but closed at the top. Extending longitudinally through the cylinder A is a shaft, $a$, on which is arranged a propeller, $b$, as shown in fig. 2. On one end of the shaft $a$, outside the cylinder A, is a pulley, D, by which the shaft $a$ is put in motion from the main shaft of the engine. The pulley is so connected to the shaft $a$ as to allow the latter a free longitudinal motion during its rotation.

$c$ represents a bell-crank lever, the lower arm of which rests against the projecting end of the shaft $a$. To the other end or arm of the lever $e$ is attached a rod or bar, $d$, connected to the link, E, as shown in fig. 1, which link is connected to the valve, and operated by means of eccentrics, in the usual manner.

The water or fluid in the cylinder A and chambers B C extends about half way up the said chambers, leaving a space in each, which adds to the resisting action of the fluid in the reservoir A, so that, as the propeller $b$ is moved forward or back, the water will be forced up into one or the other of the chambers, compressing the air in one, and causing a partial vacuum in the other. As the speed of the engine increases, the increased velocity of the propeller will cause the shaft to move with it, and act against the bell-crank lever $c$, which communicates motion to the link, and thus closes and opens the valve, as circumstances require. The weight of the link will cause the lever to bear constantly upon the end of the shaft $a$, thus regulating the motion of the steam-valve, and admitting or shutting off the steam, according to the required speed of the engine.

The arrangement of the apparatus and regulator, as shown in the drawings, is designed for a non-reversible engine. When applied to a reversible engine, the slot may be continued through the whole length of the link, and a stop may be arranged at the centre, to limit the movement of the link.

I do not claim the use of a propeller attached to shaft, and placed within a chamber containing liquid; but

What I claim, and desire to secure by Letters Patent, is—

The combination of the propeller and shaft $a\ b$, working within the cylinder A, constructed with one or more chambers B C, with the link E, crank $c$, and rod $d$, substantially as and for the purpose set forth.

In testimony whereof, I have signed my name to this specification in the presence of two subscribing witnesses.

C. H. BACON.

Witnesses:
J. H. ADAMS,
WILLIAM READ, Jr.